United States Patent [19]

Schadlich

[11] 3,712,633
[45] Jan. 23, 1973

[54] CHUCK CONSTRUCTION
[75] Inventor: Fritz Schadlich, Stetten, Germany
[73] Assignee: Robert Bosch GmbH, Stuttgart, Germany
[22] Filed: May 27, 1970
[21] Appl. No.: 40,816

[30] Foreign Application Priority Data

June 7, 1969 Germany.....................P 19 28 955.5

[52] U.S. Cl..........................279/58, 279/1 B, 279/62
[51] Int. Cl. ...............................................B23b 31/12
[58] Field of Search ..............279/64, 62, 60, 58, 1 B

[56] References Cited

UNITED STATES PATENTS

| | | | |
|---|---|---|---|
| 2,040,517 | 5/1936 | Kopsch | 279/60 X |
| 962,746 | 6/1910 | Cogswell | 279/64 |
| 2,550,871 | 5/1951 | Sharp | 279/60 |
| 1,160,138 | 11/1915 | Cobey | 279/64 |
| 1,159,344 | 11/1915 | Van Ness | 279/64 |
| 2,458,824 | 1/1949 | Axelsson | 279/64 |

Primary Examiner—Andrew R. Juhasz
Assistant Examiner—Z. R. Bilinsky
Attorney—Michael S. Striker

[57] ABSTRACT

A sleeve has a transverse wall and an inner circumferential surface tapering conically in direction axially away from the transverse wall towards an open end. An axial opening is provided in the transverse wall and a shaft member extends through the same. Cooperating steep-pitch screw threads are provided on the shaft member and in the opening. A plate member is carried by the shaft member within the sleeve in a plane normal to the axis of the shaft member and with freedom of rotation relative to the latter. Anti-friction means is interposed between and cooperates with the plate member and the shaft member. A plurality of gripping jaws is located in the sleeve intermediate the plate member and the open end and each has an axial endface abutting the plate member and an outwardly directed surface complementary to and in engagement with a portion of the inner circumferential surface. Spring means urges the gripping jaws permanently to radially spread-apart position.

7 Claims, 4 Drawing Figures

PATENTED JAN 23 1973 3,712,633

INVENTOR:
Fritz SCHÄDLICH

By Thomas I. Stule
his ATTORNEY

CHUCK CONSTRUCTION

BACKGROUND OF THE INVENTION

The present invention relates generally to a chuck construction, and more particularly to a chuck construction utilizing gripping jaws.

It is known to provide chucks wherein a sleeve member has a transverse wall through an opening in which a shaft member extends which carries interiorly of the sleeve member a transversely extending plate member. Between the plate member and the open end of the sleeve, whose inner circumferential surface tapers conically in the direction towards this open end from the transverse wall, are located a plurality of gripping jaws, usually three. Their outer surfaces are complementary to and in engagement with the conically tapering surface and they abut at one end against the plate member. Thus, if the plate member is advanced towards the open end of the sleeve, the jaws are similarly advanced in the same direction and at the same time are moved radially inwardly towards one another by sliding on the conically tapering inner circumferential surface. The plate member is rigid with the shaft member, sometimes of one piece therewith.

Chuck constructions of this type are widely popular and have the advantage that they are simple in their construction and therefore inexpensive to produce. They are particularly suitable for use with power tools, such as electrically or pneumatically operated manual drills or the like. They do have the disadvantage, however, that their change-over from a small-diameter to a large-diameter configuration—in which the jaws are closer together or farther apart to accommodate correspondingly dimensioned tools such as drill bits between them, takes rather long. This is disadvantageous especially where the tool is used for a multiplicity of different purposes, for instance if the chuck is used on a power tool of a do-it-yourself worker where it is frequently necessary to change from, for instance one drill of one diameter to a drill bit of another diameter. What has been missing in the art is a chuck which retains the simplicity of construction and the inexpensive manufacturing of the aforementioned type of chuck, but which facilitates change-over between different dimensions.

SUMMARY OF THE INVENTION

It is, accordingly, an object of the present invention to provide such a chuck construction.

More particularly it is an object of the present invention to provide such an improved chuck construction which affords the advantages of the prior-art chuck construction outlined above, while avoiding their disadvantages.

In pursuance of the above objects, and others which will become apparent hereafter, one feature of the invention resides, briefly stated, in a chuck construction comprising sleeve means having a transverse wall and an inner circumferential surface tapering conically in direction axially away from the transverse wall towards an open end of the sleeve means. An axial opening is provided in the transverse wall and a shaft member extends through this opening and has an end portion located within the sleeve means. Cooperating steep-pitch screw threads are provided on the shaft member and in the opening. A plate member is carried by the end portion within the sleeve means in a plane normal to the axis of the shaft member and with freedom of rotation relative to the latter. Anti-friction means is interposed between and cooperates with the plate member and the shaft member for facilitating rotation of the former relative to the latter. A plurality of gripping jaws is located in the sleeve means intermediate the plate member and the open end and each have an axial endface directed towards the transverse wall and an outwardly directed surface complementary to and in engagement with a portion of the inner circumferential surface. Spring means urges the gripping jaws permanently to spread-apart open position in which they define with one another a free space and in which the axial faces abut against the plate member so that, when the latter exerts axial pressure against the axial end faces in response to relative rotation of the sleeve means and shaft member in a sense advancing the plate member in a direction towards the open end, the jaws move axially in this direction and, in cooperation with the tapering inner circumferential surface, move radially inwardly towards one another to closed position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a section taken on line III—III of FIG. 2a.

DESCRIPTION OF THE PREFERRED EMBODIMENTS

Figure 1:
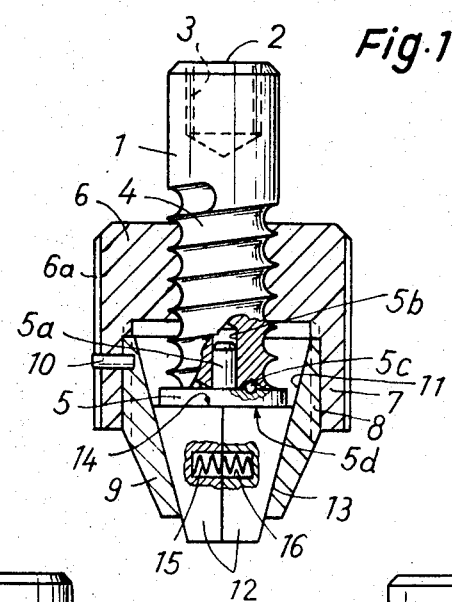
FIG. 1 is a sectional side elevation illustrating a first embodiment of the invention.

Discussing now the drawing in detail, and firstly the embodiment illustrated in FIG. 1, it will be seen that reference numeral 1 identifies a shaft, the free end face 2 whereof is provided with a tap bore 3 extending axially of the shaft. The purpose is for the bore 3 to receive an exteriorly threaded rotary spindle of a power tool, for instance a manually held electrically or pneumatically operated drill. Forwardly—downwardly in FIG. 1—of this tapped bore 2 the outer circumferential surface of the shaft 1 is provided with a steep-pitch thread 4. At its forward or lower end the shaft 1 is provided with a transversely extending member 5 a pin 5a of which is received in a bore 5b of the shaft. Anti-friction means is provided, here in form of a thrust ball bearing 5c, which supports the plate member 5 with respect to the shaft 1 for low-friction rotation. The surface 5d of the plate member 5 faces away from the shaft 1 and extends normal to the axis of the latter.

There is further provided a portion 6 of a sleeve which has an additional portion 9. The portion 6 is provided in its illustrated transverse wall with tapped threads meshing with the steep-pitch thread 4, and plate member 5 is located within the confines of the portion 6. The outer circumferential surface of the portion 6 is knurled as illustrated at 6. (Compare also reference numeral 27 in the embodiment of FIGS. 2a and 3.) The circumferential wall 7 of the portion 6 is provided on its inner side with an interior thread 8 into which the portion 9 of the sleeve is tightly threaded. A pin 10 extends through aligned bores in the portions 6 and 9 to prevent undesired rotation of the same relative to one another.

The portion 9 is provided with an inner circumferential surface 11 which conically tapers in the direction away from the plate member 5 towards a free open end of the portion 9. Located within the confines of the portion 9 are three gripping jaws 12 whose outer surfaces are correspondingly tapered and slide on portions of the inner circumferential surface 11. These outer surfaces are identified with reference numeral 13. The jaws 12 abut with surfaces 14, which are normal to the axis of the shaft 1, against the surface 5d of the plate member 5. Springs 15 engage in bores 16 of the jaws 12 to urge the latter radially away from one another. Because of the sliding engagement of the surfaces 13 with the inner circumferential surface 11, and because of the conical taper of the latter, this has the effect of urging the surfaces 14 into abutment with the plate member 5. It also has the effect of urging the jaws 12 to the maximum possible spacing from one another.

It will be appreciated that the portions 6 and 9 could be connected in other manner, for instance with a plurality of axially parallel screws passing through aligned bores in the two portions which would then be arranged for instance on a circle. The ball bearing 5c can be arranged in different manner, and other anti-friction means could be utilized. It will also be understood that the change-over between smaller and larger diameter positions of the jaws 12, that is in which the jaws are closer together and farther apart from one another, can be effected in a very simple manner because of the steep-pitch screw thread 4. It is simply necessary for the portion 6 to be turned with reference to the shaft member 1.

Figure 2:
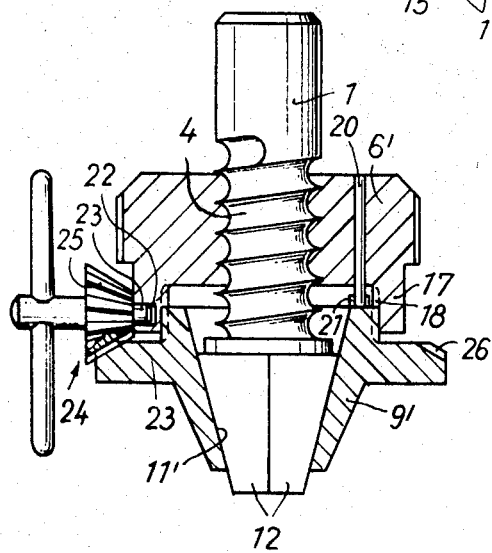
FIG. 2 is a view similar to FIG. 1, but illustrating a second embodiment of the invention.

The embodiment illustrated in FIG. 2 utilizes the shaft member 1 as before. Here, however, the portion 6' has a circumferential wall 17 which is provided with an internal thread 18 of low pitch and into which the portion 9' is threaded. A pin 20 is inserted into the portion 6' in axial parallelism with the shaft 1 and its inner free end is in the path of rotation of a projection 21 provided on the portion 9'. Thus, rotation of the portion 9' with reference to the portion 6' is limited to a value of less than 360°.

A plurality of bores 22 is provided in the wall 17 through which a pin 23 of a chuck key 24 of conventional construction can be inserted. The chuck key 24 has a bevel gear portion 25 which engages with correspondingly configurated teeth 26 on the portion 9'. The height of the teeth on the bevel gear portion 25 and the teeth 26 must be such that it accommodates the difference in the distance between the portions 6' and 9' during a rotation of the portion 9' with reference to the portion 6' which is just short of 360°. Evidently, such a rotation will cause an axial displacement of the portion 6' and 9' with reference to one another. The portion 9' has an inner circumferential surface 11' which conically tapers in the direction away from the portion 6' as in the preceding embodiment, and it accommodates three jaws 12 corresponding to those identified in FIG. 1.

Figure 2A:
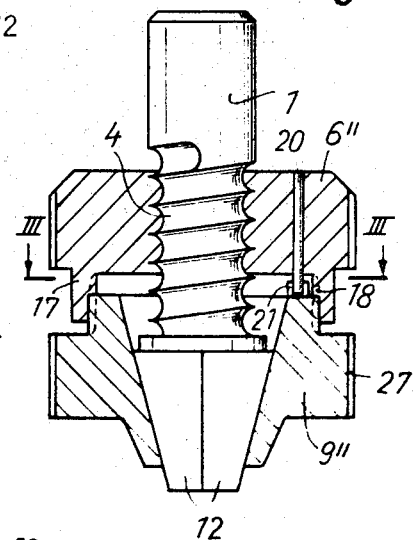
FIG. 2a is a view similar to FIG. 2 illustrating an additional embodiment of the invention.
Figure 3:
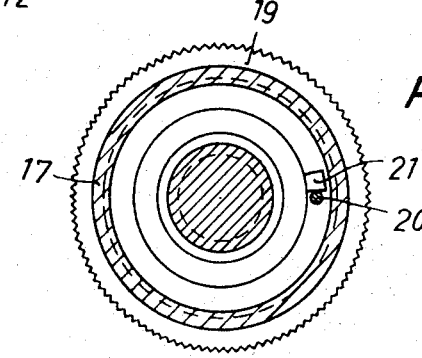

In the embodiment of FIGS. 2a and 3, finally, the construction of the chuck is analogous to that of FIG. 2 but with certain differences. Here, the outer circumference of the portions 6'' and 9''—which correspond to the portions 6' and 9' of FIG. 2—are provided with knurling 27 so that they can be readily gripped by the fingers of a user and the necessity for using a chuck key is avoided. After the rapid adjustment, which is effected by turning of the portion 6'' with reference to the shaft 1 via the steep pitch screw thread 4, the portion 9'' is turned with reference to the portion 6'' due to the provision of the threads 18, whereby the jaws 12 are tightened against whatever tool—such as a drill bit—is located between them.

It will be appreciated that the steep pitch screw thread 4 may have a single turn or a plurality of turns, and that the provision of the screw threads 18 as low-pitch threads assures the slow displacement of the portions 6' and 9' (or 6'' and 9'') with reference to one another which is desired to effect tightening of the jaws 12.

It will be understood that each of the elements described above, or two or more together, may also find a useful application in other types of constructions differing from the types described above.

While the invention has been illustrated and described as embodied in a chuck construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A chuck construction, comprising sleeve means comprising a cup-shaped member having a transverse wall and an open side opposite said transverse wall, a sleeve member telescoped into said open side and having an inner circumferential surface tapering conically in direction axially away from said transverse wall towards an open end of said sleeve means; an axial opening in said transverse wall; a shaft member extending through said opening and having an end portion located within said sleeve means; cooperating steep-pitch screw threads provided on said shaft member and in said opening; a plurality of gripping jaws located in said sleeve means intermediate said end portion and said open end, said gripping jaws each having an axial endface directed towards said transverse wall and an outwardly directed surface complementary to and in engagement with a portion of said inner circumferential surface; cooperating shallow-pitch screw threads on said cup-shaped member and said sleeve member for rotatably adjusting the relative positions thereof; limiting means for limiting the relative rotation of said cup-shaped member and said sleeve member to a factor at most approaching one complete turn; a plate member carried by said end portion within said sleeve means rotatable relative to said shaft member and having an abutment surface in a plane normal to the axis of said shaft member and in abutting engagement with said axial endfaces; anti-friction means interposed between and cooperating with said plate member and shaft member for facilitating rotation of the former relative to the latter; spring means urging said gripping jaws permanently to spread-apart open position in which they define with one another a free space and in which said axial endfaces abut against said plate member so that, when the latter exerts axial pressure against said axial endfaces in response to relative rotation of said sleeve means and shaft member in a sense advancing said plate member in direction towards said open end, said jaws due to the provision of said steep-pitch thread move rapidly axially in said direction and, in cooperation with said tapering inner circumferential surface, radially inwardly towards one another towards closed position, whereby rapid coarse adjustment of the position of said jaws relative to one another and to a tool located between them is obtained, and relative rotary adjustment of the relative positions of said cup-shaped member and said sleeve member resulting in fine adjustment of said jaws and in tightening of the same against an object located between them.

2. A chuck construction as defined in claim 1, wherein said steep-pitch screw threads comprise a plurality of turns.

3. A chuck construction as defined in claim 1, wherein said steep-pitch screw threads comprise at least one turn.

4. A chuck construction as defined in claim 1, said limiting means comprising cooperating abutments provided on said cup-shaped member and on said sleeve member.

5. A chuck construction as defined in claim 1; further comprising engaging means engageable with a chuck key for effecting relative rotation of said cup-shaped member and said sleeve member in response to engagement of such chuck key with said engaging means and subsequent turning of said chuck key.

6. A chuck construction as defined in claim 1, said cup-shaped member and said sleeve member each having an outer surface accessible to the fingers of a user; and further comprising gripping means provided on said outer surfaces for facilitating gripping and rotating of said cup-shaped member and said sleeve member by the fingers of a user.

7. A chuck construction as defined in claim 6, said gripping means comprising knurling provided at least on parts of the respective outer surfaces.

* * * * *